(12) United States Patent
Sugita et al.

(10) Patent No.: US 6,626,278 B2
(45) Date of Patent: Sep. 30, 2003

(54) CLUTCH

(75) Inventors: Norihiro Sugita, Shizuoka (JP); Shinji Furuhashi, Shizuoka (JP)

(73) Assignee: Kabushiki Kaisha F.C.C., Shizuoka (JP)

(*) Notice: Subject to any disclaimer, the term of this patent is extended or adjusted under 35 U.S.C. 154(b) by 0 days.

(21) Appl. No.: 10/126,949

(22) Filed: Apr. 22, 2002

(65) Prior Publication Data

US 2002/0170798 A1 Nov. 21, 2002

(30) Foreign Application Priority Data

Apr. 23, 2001 (JP) ........................... 2001-123806

(51) Int. Cl.$^7$ ..................... F16D 13/52; F16F 15/123
(52) U.S. Cl. ............................................. 192/70.27
(58) Field of Search ........................ 192/70.17, 70.2, 192/212, 214, 214.1

(56) References Cited

U.S. PATENT DOCUMENTS

| | | | | |
|---|---|---|---|---|
| 4,220,233 A | * | 9/1980 | Ban et al. | 74/574 |
| 4,585,105 A | * | 4/1986 | Iio et al. | 228/139 |
| 4,592,460 A | * | 6/1986 | Kittel | 192/213.31 |
| 5,030,166 A | * | 7/1991 | Worner et al. | 464/24 |
| 2002/0153221 A1 | * | 10/2002 | Schnepf | 192/70.17 |

FOREIGN PATENT DOCUMENTS

| | | |
|---|---|---|
| EP | 0 232 151 A | 8/1987 |
| JP | 3120291 | 10/2000 |

OTHER PUBLICATIONS

Patent Abstracts of Japan, vol. 018, No. 006(M–1537) & JP 05 248512 A, Sep. 24, 1993.

Patent Abstracts of Japan, vol. 008, No. 216 (M–329) & JP 59 099123A, Jun. 7, 1984.

* cited by examiner

Primary Examiner—Saúl Rodriguez
(74) Attorney, Agent, or Firm—Arent Fox Kintner Plotkin & Kahn, PLLC

(57) ABSTRACT

In a clutch in which an end wall of a clutch housing made of an iron and a retainer plate secured to the end wall are connected with a transmitting gear made of an iron and disposed between the end wall and the retainer plate for rotation relative to each other in the predetermined range of angle, damper springs and belleville springs for urging the transmitting gear toward the retainer plate are interposed between the end wall as well as the retainer plate and the transmitting gear, and a thrust washer is mounted to an outer surface of the end wall of the clutch housing for preventing the contact of the end wall and the belleville springs; detent bores are provided in the end wall of the clutch housing, and detent claws are formed on a thin thrust washer to be engaged into the detent bores. Thus, the relative rotation of the clutch housing and the thrust washer relative to each other is prevented, while providing a good assemblability of the clutch.

4 Claims, 6 Drawing Sheets

CLUTCH

BACKGROUND OF THE INVENTION

1. Field of the Invention

The present invention relates to a clutch, and particularly to an improvement in a clutch comprising: a bottomed cylindrical clutch housing made of a light alloy and having an end wall; a retainer plate secured to the end wall with a given distance left therebetween; an iron transmitting gear disposed between and connected to the end wall and the retainer plate, for rotation relative to the end wall and the retainer plate in a predetermined range of angle; damper springs interposed between the transmitting gear and the clutch housing as well as the retainer plate, for moderating a torque shock generated between them; belleville springs interposed between the transmitting gear and the clutch housing as well as the retainer plate, for urging the transmitting gear toward one of the clutch housing and the retainer plate; and a thrust washer mounted to an outer face of the end wall of the clutch housing, for preventing contact between the end wall and the belleville springs as well as the transmitting gear.

2. Description of the Related Art

In a conventional clutch, belleville springs provide a moderate resistance to the rotational friction between a clutch housing and a transmitting gear, to thereby contribute to inhibition of the vibration of damper springs. Also, a thrust washer avoids wear of the clutch housing made of a light alloy due to the sliding contact with the belleville springs or the transmitting gear, to thereby prevent a reduction in preset load of the belleville springs due to the wear.

In order to effectively prevent the wear of the clutch housing by the thrust washer, it is necessary to mount the thrust washer relatively non-rotatably to the clutch housing. For this purpose, the prior art clutch employs a structure in which detent bores are provided in the thrust washer, and detent projections are formed on an outer surface of the clutch housing so that detent bores are fitted into the detent bores, as disclosed in Japanese Patent No. 3120291.

However, the above conventional structure has the following disadvantages: A sufficient fitting depth between the detent projections and the detent bores cannot be ensured because of a relatively small thickness of the thrust washer, and if the thrust washer is floated even slightly from the outer surface of the end wall of the clutch housing during an assembling process, the fitting between the detent projections and the detent bores is released, resulting in a poor assemblability; and if the thickness of the thrust washer is increased to increase the fitting depth between the detent projections and the detent bores in order to overcome the above disadvantage, the axial dimension of the clutch is increased by a value corresponding to an increment in thickness of the thrust washer, thereby bringing about a problem deteriorating to some extent the compactness of the clutch.

The present invention has been accomplished with the above circumstances in view, and it is an object of the present invention to provide a clutch which employs a thrust washer having a smaller thickness, and can prevent the relative rotation of the clutch housing and the thrust washer relative to each other, while providing a good assemblability.

SUMMARY OF THE INVENTION

To achieve the above object, according to a first feature of the present invention, there is provided a clutch comprising: a bottomed cylindrical clutch housing made of a light alloy and having an end wall; a retainer plate secured to the end wall with a given distance left therebetween; an iron transmitting gear disposed between and connected to the end wall and the retainer plate, for rotation relative to the end wall and the retainer plate in a predetermined range of angle; damper springs interposed between the transmitting gear and the clutch housing as well as the retainer plate, for moderating a torque shock generated between them; belleville springs interposed between the transmitting gear and the clutch housing as well as the retainer plate, for urging the transmitting gear toward one of the clutch housing and the retainer plate; and a thrust washer mounted to an outer face of the end wall of the clutch housing, for preventing contact between the end wall and the belleville springs as well as the transmitting gear; wherein a detent bore is provided in the end wall of the clutch housing, and a detent claw is formed on the thrust washer so that the detent claw is engaged into the detent bore.

The transmitting gear corresponds to a driven gear 2 in the below-described embodiment of the present invention.

With the first feature, in mounting the thrust washer to the clutch housing, the detent claws formed by bending the thrust washer are brought into engagement with the detent bores in the end wall. Therefore, even if the thrust washer is formed to have a small thickness, a sufficient depth for engagement between the detent claws and the detent bores can be ensured and hence, even if the thrust washer is floated even slightly from the outer surface of the end wall of the clutch housing to some extent during an assembling process, the detent claws can be prevented from being disengaged from the detent bores, leading to an improvement in assemblability of the clutch. Moreover, it is possible to provide a reduction in axial dimension of the clutch by the employment of the thinner thrust washer.

According to a second feature of the present invention, in addition to the first feature, the length of the detent claws on the thrust washer is set at a value equal to or larger than 1.5 times the thickness of the thrust washer.

With the second feature, it is possible to ensure a good bending formability of the detent claws by pressing.

According to a third feature of the present invention, in addition to the second feature, the length of the detent claws on the thrust washer is set longer than the length of the detent bores.

With the third feature, it is possible to ensure a good formability of the detent claws and to prevent slipping-off of the detent claws from the detent bores further reliably during assembling of the clutch.

According to a fourth feature of the present invention, in addition to any of the first to third features, a lubricating oil is supplied from the inside of the clutch housing through the detent bores toward the damper springs.

With the fourth feature, the detent bores also serves as oil supply bores and hence, it is possible to provide an improvement in durability of the portions of the damper springs and components around the damper springs, and to simplify the structure.

DETAILED DESCRIPTION OF THE PREFERRED EMBODIMENT

The present invention will now be described with reference to the an embodiment shown in the accompanying drawings.

Figure 1:
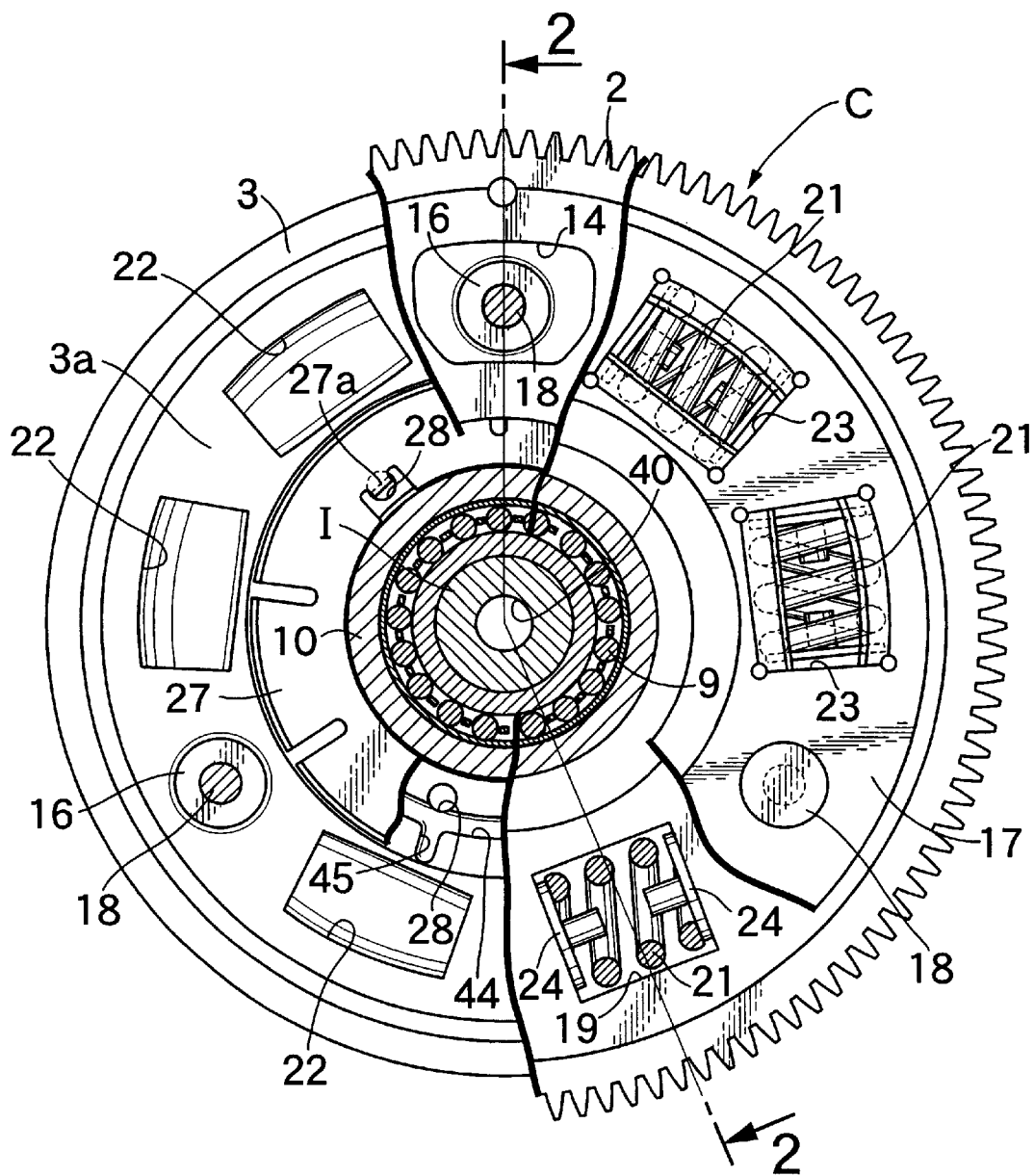
FIG. 1 is a partially cutaway front view of a wet multi-plate clutch according to the present invention.
Figure 2:
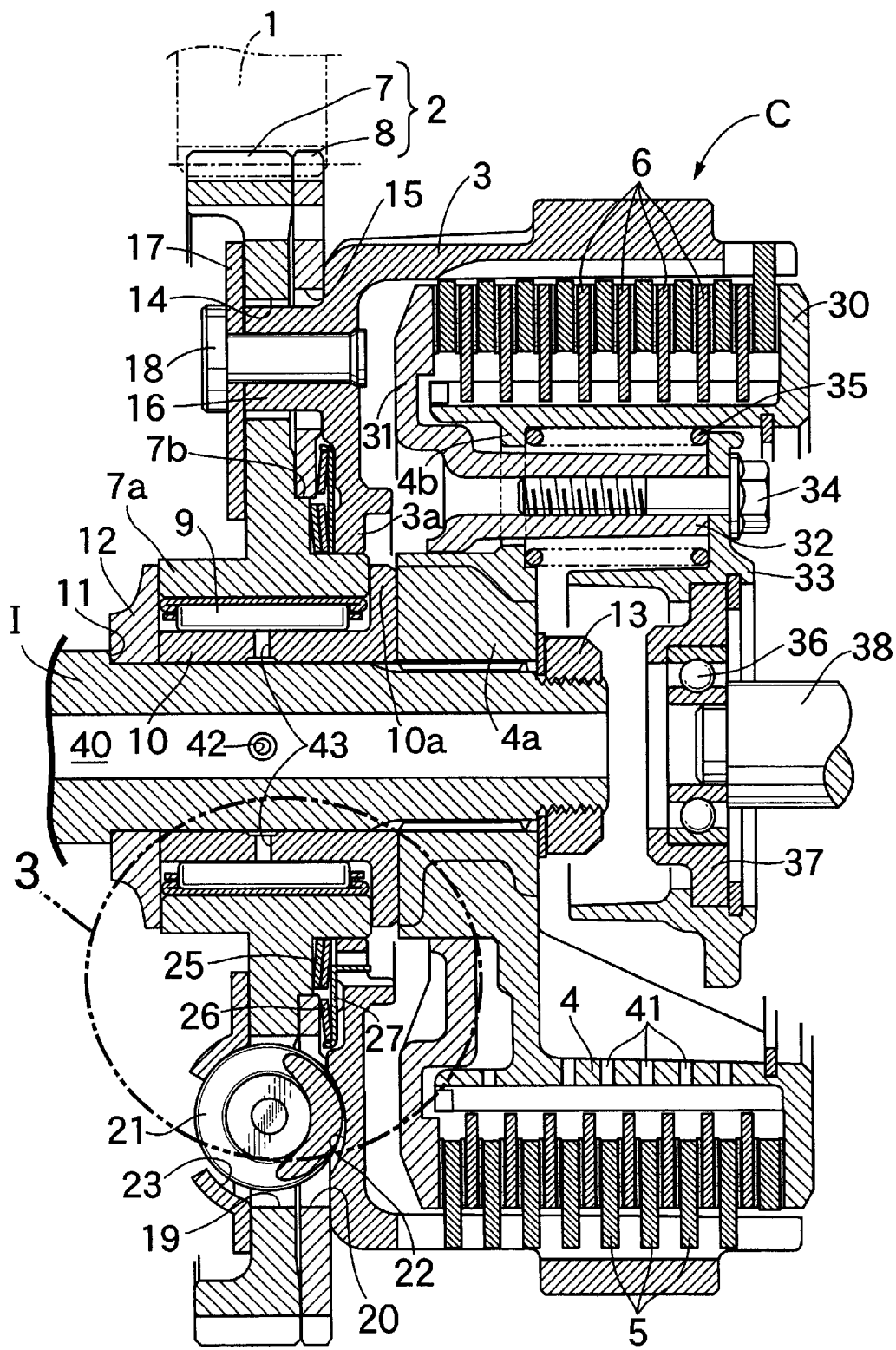
FIG. 2 is a sectional view taken along a line 2—2 in FIG. 1.

First, in FIGS. 1 and 2, reference character C denotes a wet multi-plate clutch for a motorcycle, which transmits a power from an engine (not shown) to an input shaft I of a transmission, and cuts off the transmission of the power.

The clutch C includes driven gears 2 meshed with a driving gear 1 secured to a crankshaft of an engine, a bottomed cylindrical clutch housing 3 mounting the driven gears 2 to an outer surface of its end wall 3a, a clutch center 4 concentrically disposed within the clutch housing 3, a plurality of driving frictional plates 5 axially slidably spline-coupled to an inner periphery of the clutch housing 3, and a plurality of driven frictional plates 6 axially slidably fitted over an outer periphery of the clutch center 4. The driven gears 2 comprise a thicker main gear 7 and a thinner subsidiary gear 8, which are meshed simultaneously with the driving gear 1 and each made of iron. On the other hand, each of the clutch housing 3 and the clutch center 4 is made of a light alloy such as an aluminum alloy inferior in wear resistance to the iron.

The main gear 7 has a hub 7a rotatably carried on a tubular support 10 with a needle bearing 9 interposed therebetween. The tubular support 10 is secured to the input shaft I along with the boss 4a of the clutch center 4. More specifically, the tubular support 10 is fixed in a clamped manner by an end plate 12 abutting against an annular shoulder 11 of the input shaft I and by the boss 4a of the clutch center 4 spline-fitted to the input shaft I and secured thereto by a nut 13. The tubular support 10 has a flange 10a at its end opposite from the end plate 12, so that the axial movement of the hub 7a of the main gear 7 is inhibited by the flange 10 and the end plate 12.

The subsidiary gear 8 is relatively rotatably carried on an outer peripheral surface of an annular step 7b formed on an inner surface of the main gear 7 on the side of the clutch housing 3.

A plurality (three in the illustrated embodiment) of circumferentially extending elongated bores 14, 15 are defined at circumferentially equal distances in the main and subsidiary gears 7 and 8, respectively. On the other hand, a plurality of connecting bosses 16 are integrally formed on an outer surface of the end wall 3a of the clutch housing 3, to extend through the elongated bores 14 and 15. A retainer plate 17 is secured to end faces of the connecting bosses 16 by a rivet 18, to abut against the outer surface of the main gear 7. Thus, the angle of relative rotation of the main and subsidiary gears 7 and 8 and the clutch housing 3 is limited to a given value by the abutment of the connecting bosses 16 against longitudinally opposite ends of the elongated bores 14 in the main gear 7.

A plurality of retaining bores 19, 20 are circumferentially provided in each of the main and subsidiary gears 7 and 8. A common coil damper spring 21 is mounted in the axially adjacent retaining bores 19 and 20 in the main and subsidiary gears 7 and 8 with a predetermined preset load (a compression load) and with its axis directed circumferentially. A seat plate 24 is disposed at each of the opposite ends of the damper spring 21. In this case, a slight difference in phase is provided between teeth of the main and subsidiary gears 7 and 8, and teeth of the driving gear 1 are meshed simultaneously with the teeth of the main and subsidiary gears 7 and 8. In this manner, a backlash between the driving and driven gears 1 and 2 is eliminated.

Each of the damper springs 21 and the corresponding seat plates 24 overhang on their opposite sides, out of the retaining bores 19 and 20, and recesses 22 and retaining windows 23 for receiving the overhanging portions are provided in the end wall 3a of the clutch housing 3 and the retainer plate 17. Inner end walls of the recess 22 and the retaining window 23 are usually opposed to opposed ends of the corresponding damper spring 21, i.e., to the seat plate 24 with a very small gap left therebetween, but when a torque equal to or larger than the preset load of the damper spring 21 is applied between the driven gear 2 and the clutch housing 3 as well as the retainer plate 17, the inner end of one of the recess 22 in the end wall 3a and the retaining window 23 in the retainer plate 17 presses the damper spring 21 through one of the end plates 24, to cause the compressed deformation of the spring 21.

Figure 3:
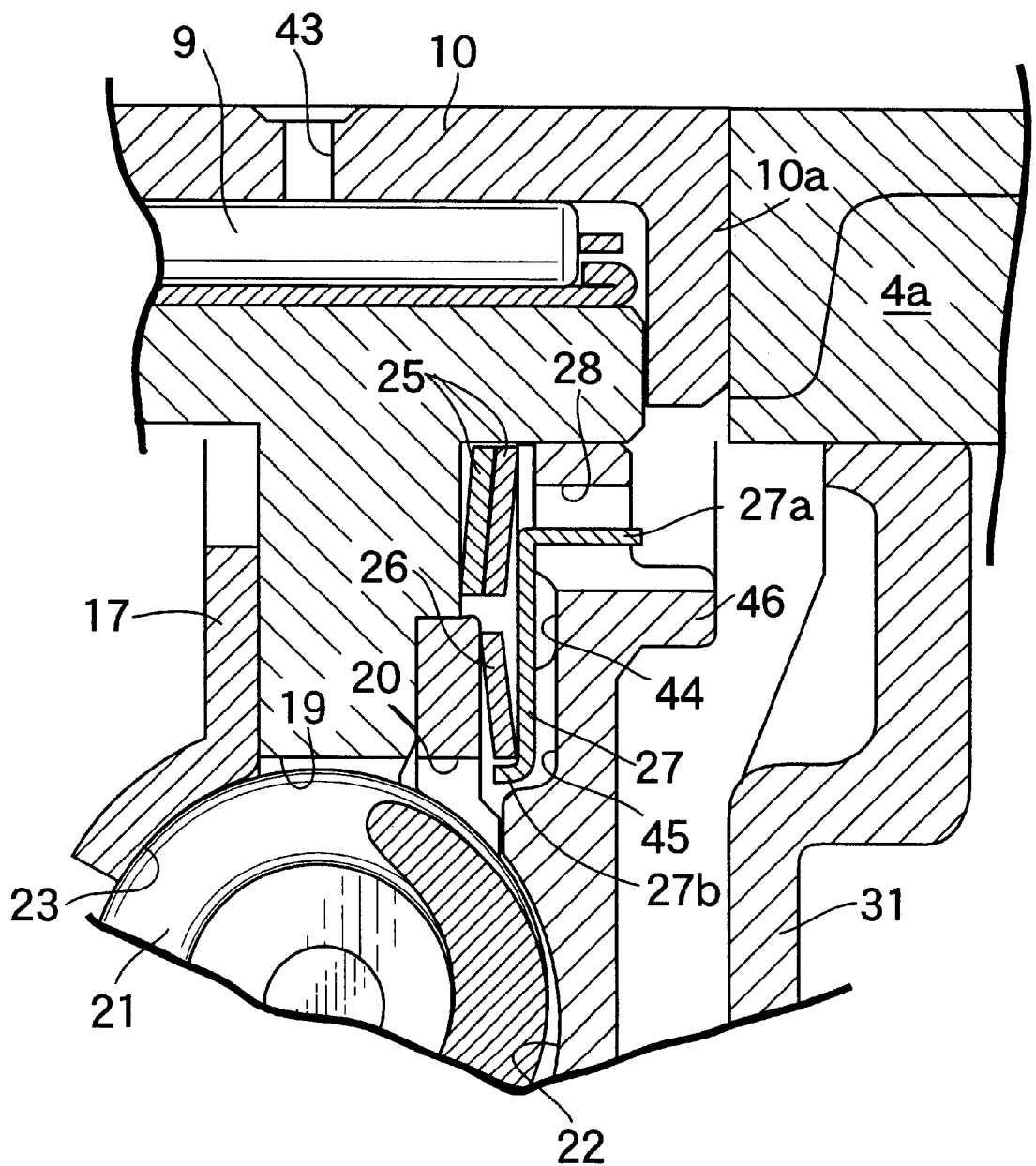
FIG. 3 is an enlarged view of an area indicated by 3 in FIG. 2.

As shown in FIG. 3, a single or a plurality of belleville springs 25, 26 are interposed between the end wall 3a of the clutch housing 3 and each of the main and subsidiary gears 7 and 8, to urge each of the main and subsidiary gears 7 and 8 toward the retainer plate 17. A common single thrust washer 27 is interposed between the belleville springs 25 and 26 and the end wall 3a, to prevent the direct contact of them.

Figure 5:
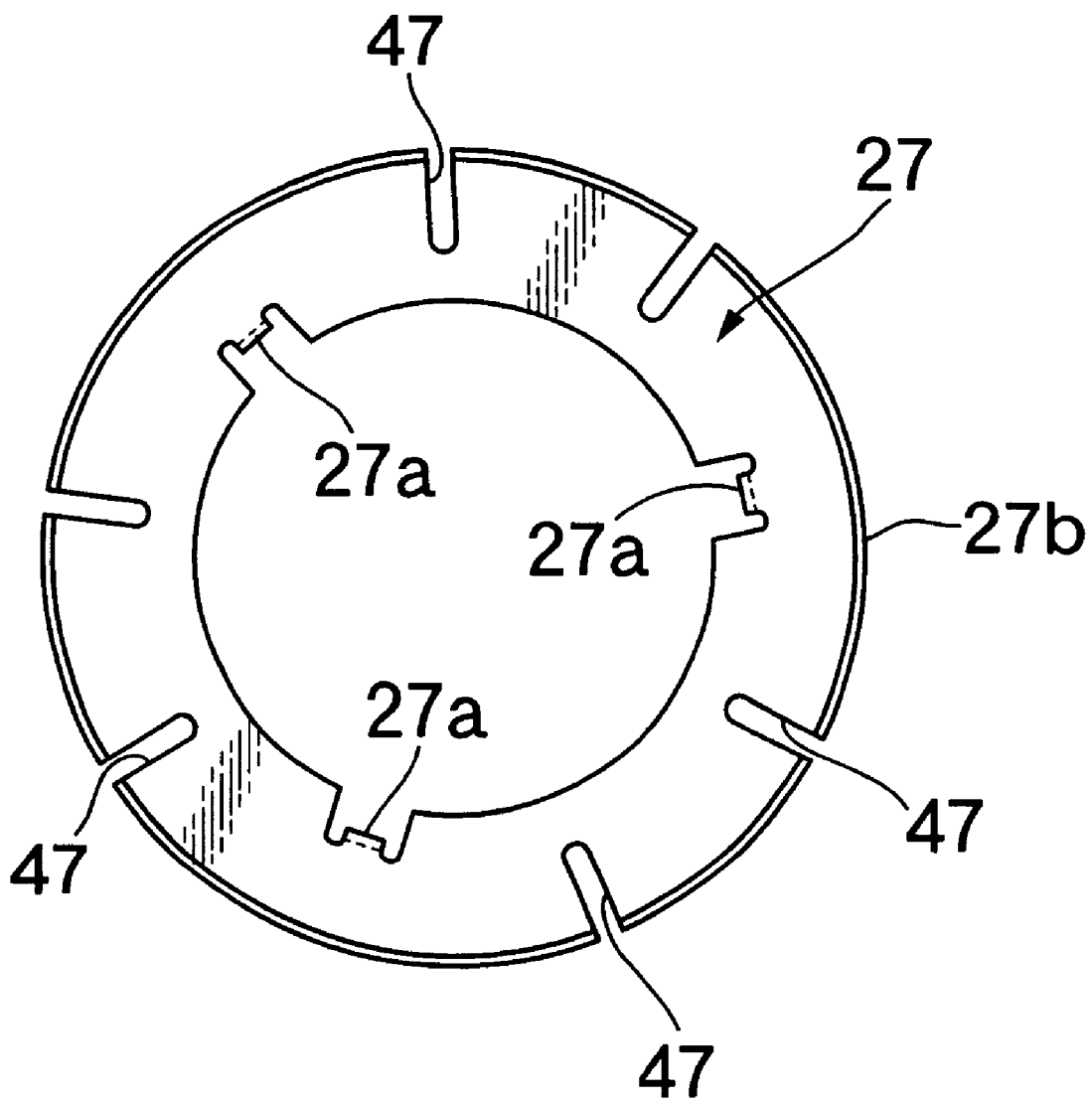
FIG. 5 is a front view of a thrust washer in the clutch.

As shown in FIGS. 3 and 5, the thrust washer 27 is annular, and a plurality of detent claws 27a are formed by bending at circumferentially equal distances in an inner peripheral edge of the thrust washer 27 to extend to axially one side. The detent claws 27a are engaged into a plurality of detent bores 28 provided in the end wall 3a, thereby inhibiting the rotation of the clutch housing 3 and the thrust washer 27 relative to each other. The detent claws 27a are formed by bending by use of a press.

If it is taken into a consideration that when the thrust washer 27 is floated from the end wall 3a during assembling of the clutch C, the detent claws 27a should be prevented from being disengaged from the detent bores 28, and the bending formability of the detent claws 27a, it is required that the length of the claws 27a is equal to or larger than 1.5 times the thickness of the thrust washer 27.

In the illustrated embodiment, the length of the detent claws 27a is larger than the length of the detent bores 28. With this configuration, it is possible to reliably prevent the disengagement of the detent claws 27a from the detent bores 28 upon floating of the thrust washer 27, while ensuring the good formability of the claws 27a.

An annular edge 27b is formed at an outer peripheral edge of the thrust washer 27 to protrude to the axially other side, and the belleville spring 25 is fitted to an inner peripheral surface of the edge 27b and thus positioned.

Referring again to FIG. 2, the clutch center 4 is integrally provided with a receiving plate 30 opposed to the outermost driving frictional plate 5 located on the opened end side of the clutch housing 3. A pressing plate 31 is disposed being opposed to the innermost driving frictional plate 5 and capable of pressing the driving and driven frictional plates 5 and 6 toward the receiving plate 30. A plurality of support shaft 32 (only one of them is shown in FIG. 2) are integrally formed on the pressing plate 31 to extend through a web plate 4b of the clutch center 4. A release plate 33 is secured to tip ends of the support shafts 32 by a bolt 34, and a coil clutch spring 35 is mounted under compression between the release plate 33 and the web plate 4b, to urge the pressing plate 31 toward the receiving plate 30 with a predetermined preset load.

A bearing holder 37 with an outer race of a release bearing 36 fitted therein is mounted to the release plate 33, and a release rod 38 is fitted to an inner race of the release bearing 36.

An oil passage 40 is defined in a center portion of the input shaft I and opens into the clutch center 4. During operation of the engine, a lubricating oil is supplied from an oil pump (not shown) into the oil passage 40. A large number of oil bores 41 are defined in the clutch center 4 to permit its inner peripheral surface to communicate with its outer peripheral surface. Oil bores 42 and 43 are defined in the input shaft I and the tubular support 10, respectively, to permit the oil passage 40 communicate with the needle bearing 9.

Figure 4:
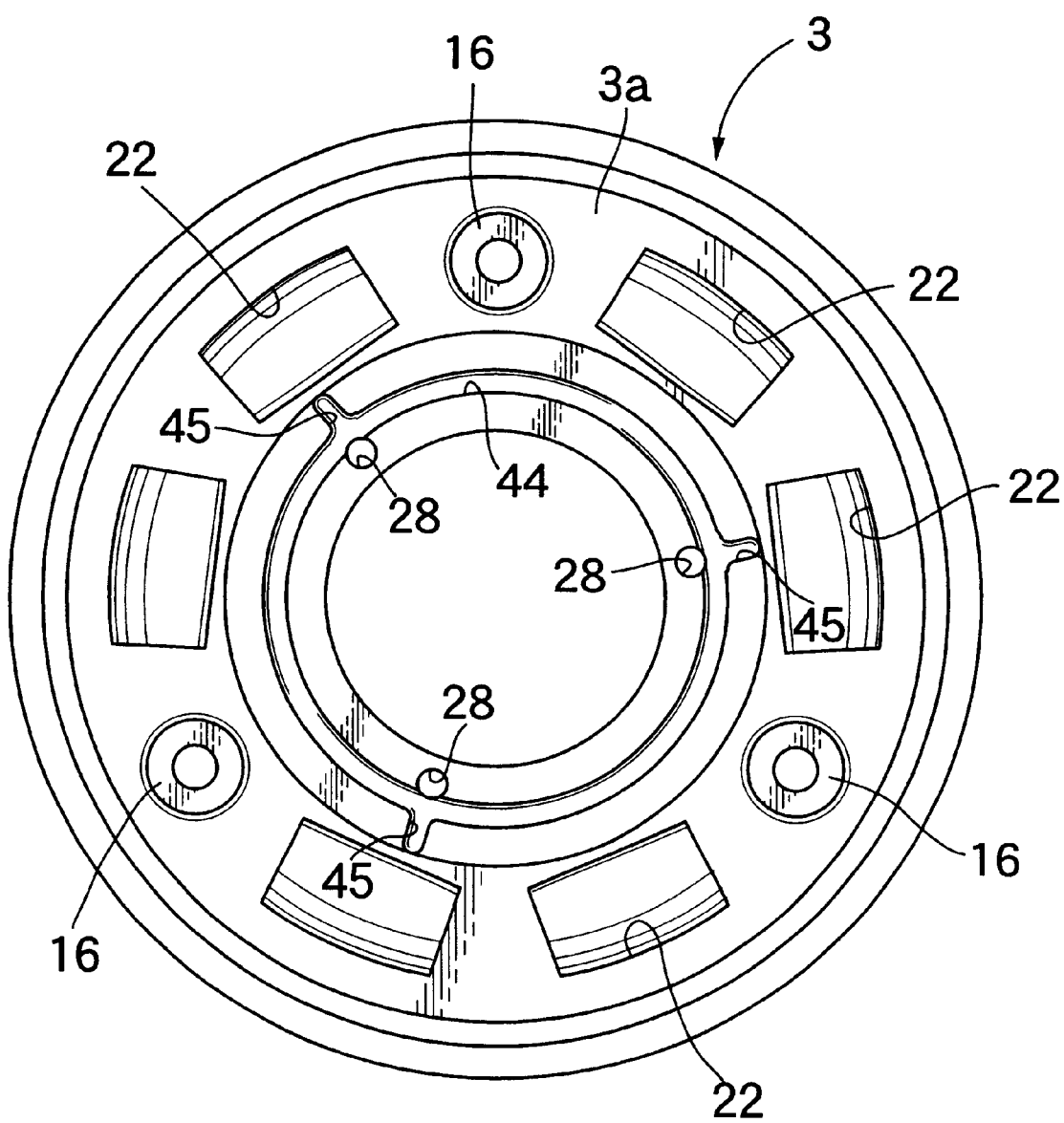
FIG. 4 is a front view of a clutch housing in the clutch.

As shown in FIGS. 3 and 4, defined in the outer surface of the end wall 3a of the clutch housing 3 are an annular oil groove 44 permitting the plurality of detent bores 28 to communicate with one another, and a plurality of radial oil grooves 45 extending outwards from the annular oil groove 44. Tip ends of the radial oil grooves 45 are terminated in the vicinity of outer peripheral edges of the belleville springs 25. An annular surrounding wall 46 is projectingly provided on an inner surface of the end wall 3a in proximity to the plurality of detent bores 28 to surround the detent bores 28 annularly.

Figure 6:
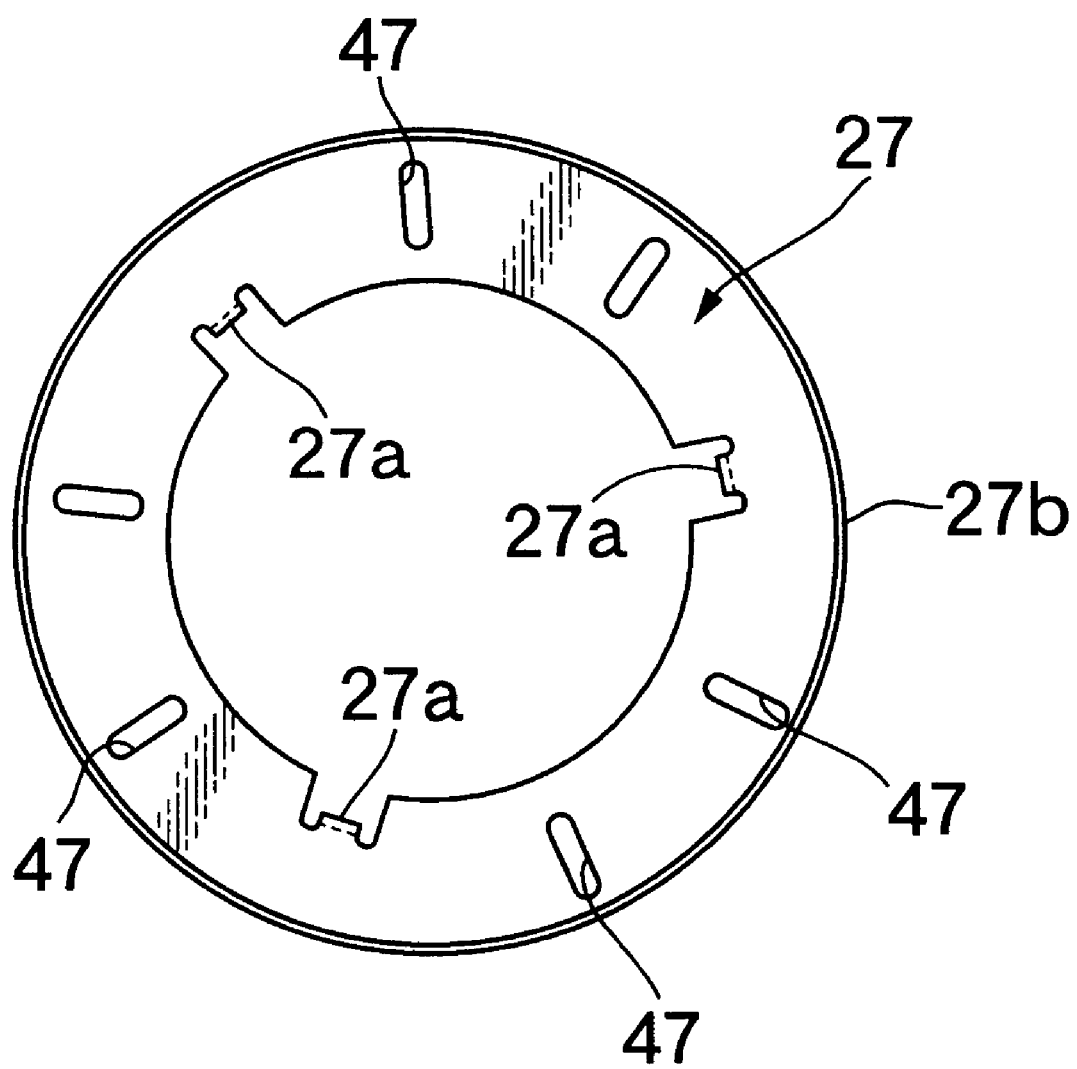
FIG. 6 is a front view showing a modification to the thrust washer.

Further, as shown in FIG. 5, a plurality of radial slits 47 are provided in the thrust washer 27, to open into an outer peripheral end of the washer 27 and to communicate with the annular oil groove 44 in the outer surface of the end wall 3a. As shown in FIG. 6, each of the radial slits 47 may be of a shape with its opposite ends closed.

The operation of the present embodiment will be described below.

When the clutch C is in an interrupting state, the release plate 33 is urged by the release rod 38 through the release bearing 36 against the urging force of the clutch spring 35, to retract the pressing plate 31 from the driving and driven frictional plates 5 and 6. Therefore, the driving and driven frictional plates 5 and 6 are in free states in which they receive no clamping from the pressing plate 31 and the receiving plate 30. Thus, even if an output torque from the crankshaft of the engine (not shown) is transmitted through the driving gear 1 to the driven gears 2, the damper springs 21 and the clutch housing 3, the torque is interrupted or cut off between the driving and driven frictional plates 5 and 6 and hence, the transmission of the torque to the input shaft I is not achieved.

When the clutch C is in a connecting state, the release rod 38 is released, and the pressing plate 31 and the receiving plate 30 clamp the driving and driven frictional plates 5 and 6 therebetween under the urging force of the clutch spring 35, so that the adjacent driving and driven frictional plates 5 and 6 are in pressure contact with each other. Therefore, when the output torque from the crankshaft of the engine is transmitted through the driving gear 1 to the driven gears 2, the torque is transmitted sequentially via the damper springs 21, the clutch housing 3, the driving frictional plates 5, the driven frictional plates 6 and the clutch center 4, to the input shaft I.

When a fluctuation in torque is caused due to the acceleration or deceleration of the rotation of the engine in such connecting state of the clutch C and a torque shock equal to or larger than the preset load of the damper spring 21 is applied to the damper spring 21, the relative rotation of the clutch housing 3 and the retainer plate 17 relative to each other occurs, and the damper spring 21 is compressed and deformed, whereby the torque shock can be absorbed.

The driven gears 2 and the retainer plate 17 are retained in pressure contact with each other by the belleville springs 25 and 26 inserted between the driven gears 2 and the end wall 3a of the clutch housing 3. Therefore, it is possible to inhibit the vibration of the damper springs 21 by a resistance in the friction produced on pressure-contact portions of the driven gears 2 and the retainer plate 17 during relative rotation of the driven gears 2 and the retainer plate 17 relative to each other, thereby enhancing the torque-shock absorbing function of the damper springs 21.

Moreover, the thrust washer 27 is mounted to the outer surface of the end wall 3a of the clutch housing 3 made of the light alloy, to prevent the direct contact of the end wall 3a with the belleville springs 25 and 26 and the driven gears 2 and hence, it is possible to avoid that the end wall 3a is rubbed and worn by the other members, i.e., the belleville springs 25 and 26 in the illustrated embodiment, despite the above-described relative rotation. Therefore, the clutch housing 3 is inferior in wear resistance to the driven gears 2 made of the iron and the thrust washer 27, but it is possible to prevent a reduction in preset load of the belleville springs 25 and 26 due to the wear of the outer surface of the end wall 3a, and to constantly stabilize the vibration inhibiting effect of the damper springs 21 by the resistance to the friction between the driven gears 2 and the retainer plate 17.

During operation of the engine, the lubricating oil discharged from the oil pump (not shown) is fed via the oil passage 40 in the input shaft I into the clutch center 4, and a portion of the lubricating oil is used for the lubrication of the release bearing 36, and the remaining lubricating oil passes through the oil bores 41 in the clutch center 4 and used for cooling the driving and driven frictional plates 5 and 6. A portion of the oil in the oil passage 40 passes through the oil bores 42 and 43 in the input shaft I and the tubular support 10 to lubricate the needle bearing 9, and then passes through between the hub 7a of the main gear 7 and the flange 10a of the tubular support 10 into the clutch housing 3, but thereafter, its course is changed immediately toward the detent bores 28 by the surrounding wall 46 on the inner surface of the end wall 3a of the clutch housing 3. After passing through the detent bores 28, the oil is diverted into the annular oil groove 44 and the radial oil grooves 45 in the outer surface of the end wall 3a, and flows out from the grooves to achieve the lubrication between the belleville springs 25, 26 and the end wall 3a, between the surfaces of the end wall 3a and the damper springs 21, between the driven gears 2 and the belleville springs 25, 26, between the driven gears 2 and the damper springs 21 and between the damper springs 21 and the retainer plate 17, to thereby contribute to an enhancement in durability of these portions. Particularly, the oil is retained in the slits 47 in the thrust washer 27, whereby both the inner and outer surfaces of the thrust washer 27 can be lubricated reliably.

To assemble the thrust washer 27 to the end wall 3a of the clutch housing 3 during assembling of the clutch C, the plurality of detent claws 27a formed by bending the inner peripheral edge of the thrust washer 27 are engaged into the detent bores 28 in the end wall 3a. Therefore, even if the thrust washer 27 is formed to have a smaller thickness, a sufficient depth for engagement between the detent claws 27a and the detent bores 28 can be ensured. As a result, even if the thrust washer 27 is floated slightly from the outer surfaces of the driven gears 2 during assembling of the clutch C, it is possible to reliably prevent the slipping-off of the detent claws 27a from the detent bores 28, leading to an improvement in assemblability of the clutch C. In addition, it is possible to provide a reduction in axial dimension of the clutch C by the employment of the thinner thrust washer 27.

The detent bores 28 in the end wall 3a of the clutch housing 3 are also used as oil supply bores for supplying the oil from the inside of the clutch housing 3 toward the damper springs 21. This contributes to an improvement in durability of each of the portions and components, and to the simplification of the structure.

The belleville springs 25 and 26 may be interposed between the driven gears 2 and the retainer plate 17. In addition, the driven gear 2 may comprises a single gear.

As described above, according to the first feature of the present invention, the clutch comprises: a bottomed cylindrical clutch housing made of a light alloy and having an end wall; a retainer plate secured to the end wall with a given distance left therebetween; an iron transmitting gear disposed between and connected to the end wall and the retainer plate, for rotation relative to the end wall and the retainer plate in a predetermined range of angle; damper springs interposed between the transmitting gear and the clutch housing as well as the retainer plate, for moderating a torque shock generated between them; belleville springs interposed between the transmitting gear and the clutch housing as well as the retainer plate, for urging the transmitting gear toward one of the clutch housing and the retainer plate; and a thrust washer mounted to an outer face of the end wall of the clutch housing, for preventing contact between the end wall and the belleville springs as well as the transmitting gear; wherein a detent bore is provided in the end wall of the clutch housing, and a detent claw is formed on the thrust washer so that the detent claw is engaged into the detent bore. Therefore, even if the thrust washer is formed to have the small thickness, the sufficient depth for engagement between the detent claws and the detent bores can be ensured and hence, even if the thrust washer is floated from the outer surface of the end wall of the clutch housing to some extent, the detent claws can be prevented from being disengaged from the detent bores, leading to an improvement in assemblability of the clutch. Moreover, it is possible to provide a reduction in axial dimension of the clutch by the employment of the thinner thrust washer.

According to the second feature of the present invention, in addition to the first feature, the length of the detent claws on the thrust washer is set at the value equal to or larger than 1.5 times the thickness of the thrust washer. Therefore, it is possible to ensure a good bending formability of the detent claws by pressing.

According to the third feature of the present invention, in addition to the second feature, the length of the detent claws on the thrust washer is set longer than the length of the detent bores. Therefore, it is possible to ensure a good formability of the detent claws and to prevent the slipping-off of the detent claws from the detent bores further reliably during assembling of the clutch.

According to the fourth feature of the present invention, in addition to any of the first to third features, the lubricating oil is supplied from the inside of the clutch housing through the detent bores toward the damper springs. Therefore, the detent bores also serves as the oil supply bores and hence, it is possible to provide an improvement in durability of the portions and components around the damper springs and to the simplification of the structure. washer.

The present invention is not limited to the above described embodiment, and various modifications in design may be made without departing from the subject matter of the present invention.

What is claimed is:

1. A clutch comprising:

a bottomed cylindrical clutch housing made of a light alloy and having an end wall;

a retainer plate secured to the end wall with a given distance left therebetween;

an iron transmitting gear disposed between and connected to the end wall and the retainer plate, for rotation relative to the end wall and the retainer plate in a predetermined range of angle;

damper springs interposed between the transmitting gear and the clutch housing as well as the retainer plate, for moderating a torque shock generated between them;

belleville springs interposed between the transmitting gear and the clutch housing as well as the retainer plate, for urging the transmitting gear toward one of the clutch housing and the retainer plate; and a thrust washer mounted to an outer face of the end wall of the clutch housing, for preventing contact between the end wall and the belleville springs as well as the transmitting gear;

wherein a detent bore is provided in the end wall of the clutch housing, and a detent claw is formed on the thrust washer so that the detent claw is engaged into the detent bore.

2. A clutch according to claim 1, wherein the length of the detent claws on the thrust washer is set at a value equal to or larger than 1.5 times the thickness of said thrust washer.

3. A clutch according to claim 2, wherein the length of the detent claws on the thrust washer is set longer than the length of the detent bores.

4. A clutch according to any of claims 1 to 3, wherein a lubricating oil is supplied from the inside of the clutch housing through the detent bores toward the damper springs.

* * * * *